Patented June 15, 1926.

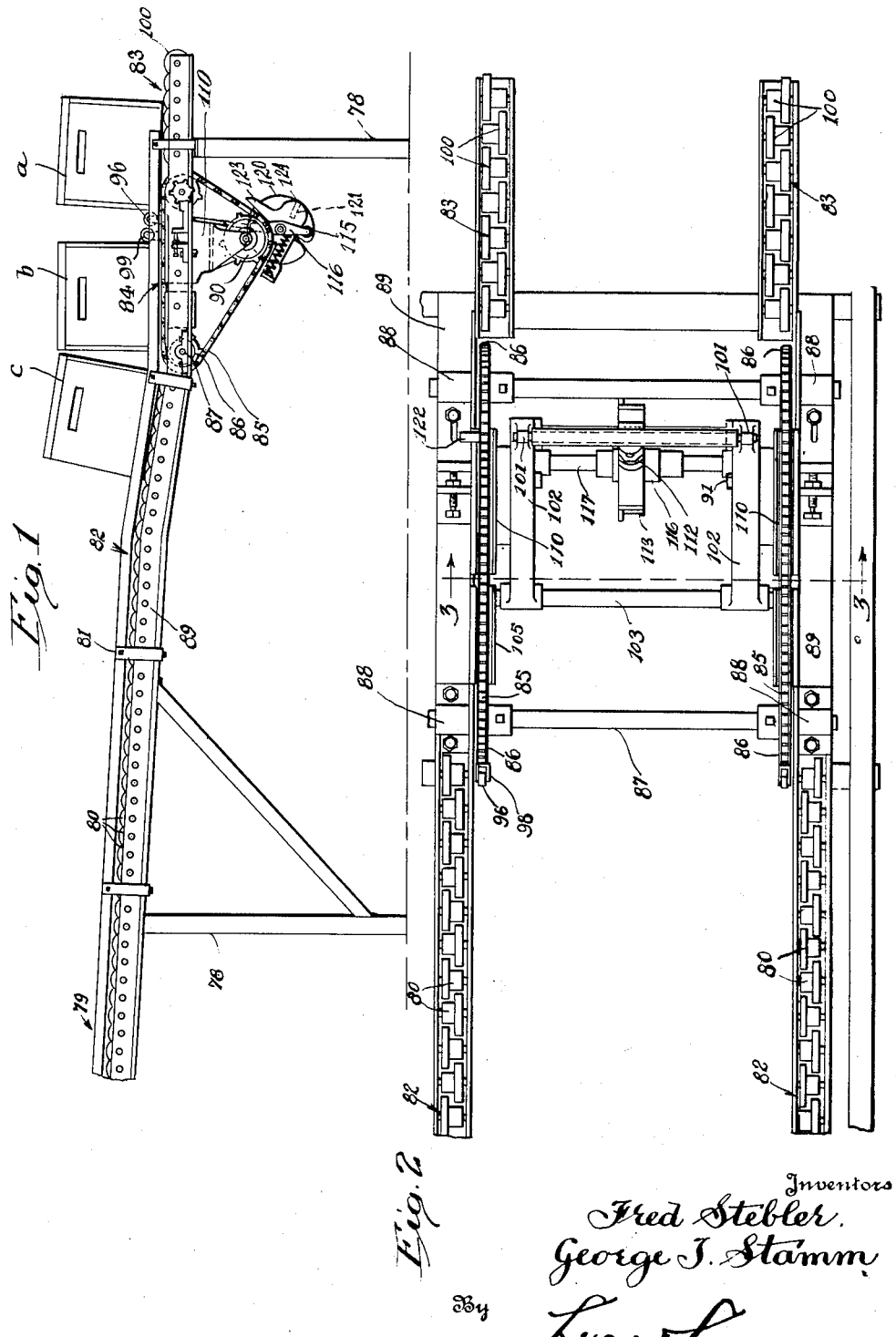

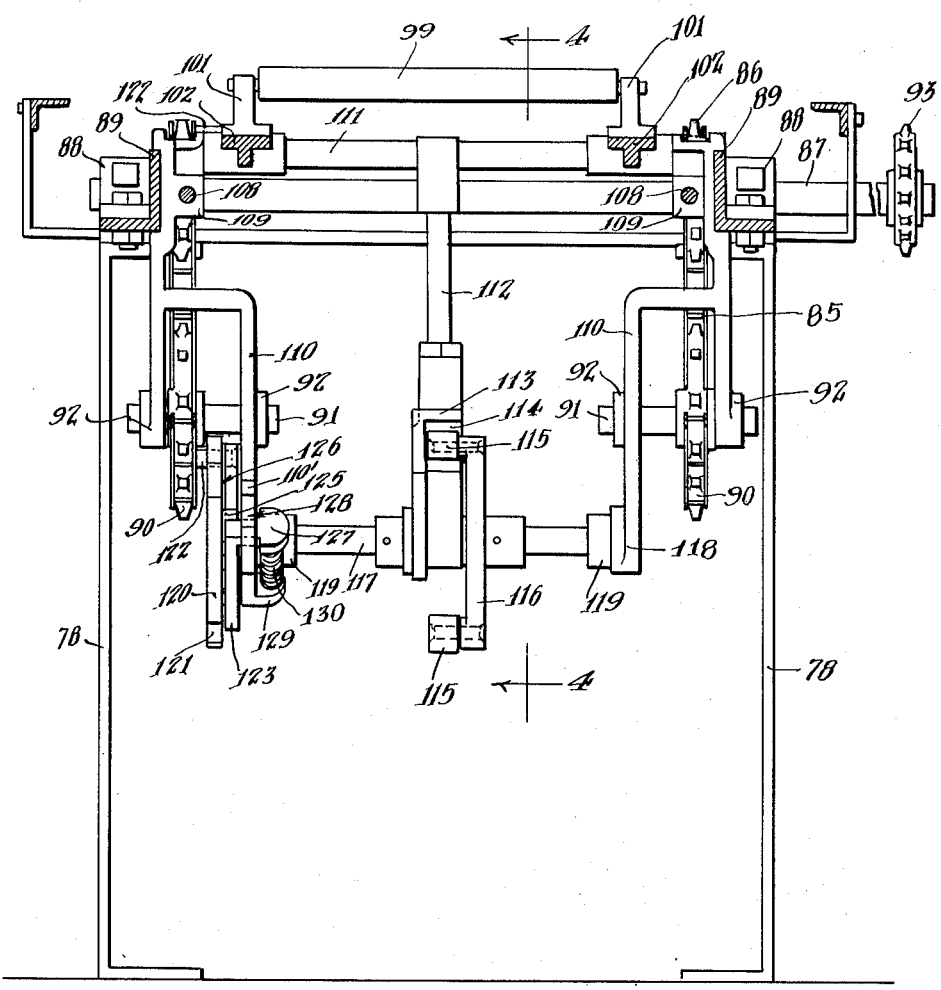

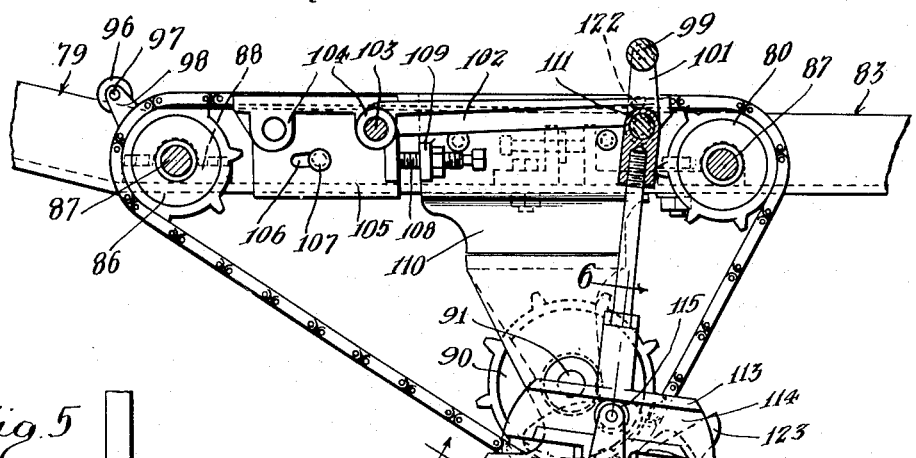

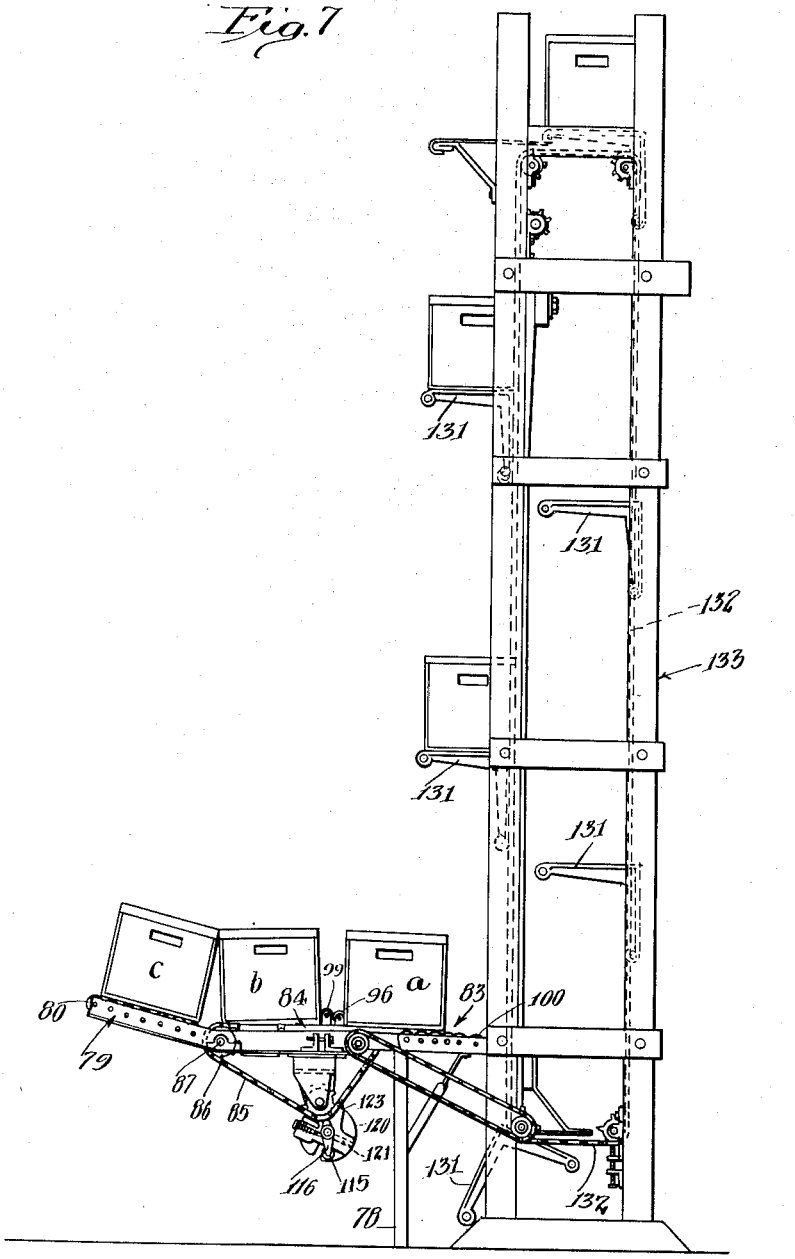

1,588,821

UNITED STATES PATENT OFFICE.

FRED STEBLER, OF RIVERSIDE, AND GEORGE T. STAMM, OF UPLAND, CALIFORNIA, ASSIGNORS TO STEBLER PARKER CO., OF RIVERSIDE, CALIFORNIA, A CORPORATION OF CALIFORNIA.

BOX-FEEDING APPARATUS.

Original application filed April 19, 1919, Serial No. 291,243, Patent No. 1,474,857, dated November 20, 1923. Divided and this application filed September 4, 1923. Serial No. 660,707.

This invention relates to mechanism for receiving and positively feeding boxes one at a time, and is a division of our copending application, Serial No. 291,243, filed April 19, 1919, now Patent 1,474,857, Nov. 20, 1923.

An object of the invention is to effect the feeding by an apparatus that functions reliably and by one that is of comparatively simple construction when the various functions of the machine are taken into consideration.

One of the objects of the invention is to make provision for positively feeding boxes one at a time so that the boxes being fed will not interfere with one another.

Other objects and advantages will appear in the subjoined detailed description.

The accompanying drawings illustrate the invention:—

Fig. 1 is a side elevation of a box feeding apparatus constructed in accordance with the provisions of this invention.

Fig. 2 is an enlarged plan view of the discharge end portion of the apparatus shown in Fig. 1.

Fig. 3 is an enlarged sectional elevation on the line indicated by 3—3, Fig. 2.

Fig. 4 is a sectional elevation on the line indicated by 4—4, Fig. 3.

Fig. 5 is an enlarged sectional detail on the line indicated by 5—5, Fig. 4.

Fig. 6 is an enlarged sectional detail on the line indicated by 6—6, Fig. 4.

Fig. 7 is a side elevation of a box handling apparatus embodying the invention, the feeding means corresponding to the showing in Fig. 1 and being associated with an elevator.

Mounted on suitable supports 78 is a gravity feed conveyer indicated in general by the character 79. The gravity conveyer 79 comprises rotatively mounted rollers 80 and the portion 81 of the conveyer slopes gently downward and rearward toward the discharge end of the apparatus so that boxes placed thereon will be caused by gravity to roll upon the rollers 80 toward any apparatus to which the boxes are to be fed. Another portion 82 of the conveyer slopes downwardly and forwardly at a somewhat greater angle than the portion 81 for a reason to be hereinafter set forth. Another portion 83 of the conveyer is substantially level and is spaced from the portion 82, such space being indicated at 84. In the space 84 extending substantially from the conveyer portion 82 to the conveyer portion 83 are endless conveyer chains 85 mounted on sprockets 86 which are fast on shafts 87 journaled in bearings 88 that are mounted on the side members 89 of the conveyer 79. The chains 85 extend along the inner faces of the conveyer side members 89 and said chains also pass beneath sprocket wheels 90 fixed to shafts 91 journaled in bearings 92 on brackets 110 which are hung from the conveyer side members 89, as clearly shown in Fig. 3. Thus, it will be seen that the portion 85 of the box-conveying means is inclined upwardly with respect to the adjacent portion 82 of said conveying-means to effect relative tilting of boxes on the two portions to create a space between the boxes, as one of said boxes passes from the conveyer portion 82 onto the conveyer 85. Such space is shown in Fig. 1 between the boxes $b$, $c$, and is formed by relative tilting of said boxes.

The rear conveyer shaft 87 is provided with a sprocket wheel 93 that may be connected by an endless sprocket chain, not shown, with a sprocket wheel, not shown, that may be driven in any suitable manner. The conveyer chains 85 are provided with abutments in the form of rollers 96 each journaled at 97 in a bifurcated arm 98 on one of the links of the chain. These rollers 96 are adapted to engage the rear ends of the boxes as the chains 85 impel the boxes rearward toward the discharge ends. The conveyer portion 83 constitutes a platform or table on which the boxes rest and from which the boxes may be picked up by elevator box supports 131, or other members that may be impelled upward between the two rows of rollers 100 of the conveyer portion 83. The box supports 131 are operated by the endless chains 132 of an elevator indicated in general in Fig. 7 by the character 133. Thus said box supports can move upward in under the box and lift the same from the platform.

A stop roller 99 functions to regulate the feed of the boxes to the portion 83 of the conveyer. Means are provided to move the roller 99 up and down at the appropriate times so as to insert it in the space formed between adjacent boxes by the relative tilting of said boxes and so as to retract the roller 99 to a position below the level of the horizontal runs of the chains 85 in order that the box on the chains 85 may be propelled rearward by said chains. In the instance shown in the drawings the means for reciprocating the roller 99 are constructed as follows: The roller 99 is rotatively mounted in bearings 101 on the rear ends of arms 102 respectively which are fixed at their forward ends to a shaft 103, journaled at each end in either one of bearings 104 that are carried by an adjustable slide 105. The adjustable slides 105 are provided with slots 106 through which extend bolts 107 projecting from the inner faces of the conveyer side members 89. The shaft 103 will be journaled in the rearmost bearings 104, when a longer box is to be accommodated between the roller 99 and the rollers 96, and, when a shorter box is to be accommodated between said rollers, said shaft 103 will be journaled in the forward bearings 104. The slides 105 may be adjusted horizontally by adjusting screws 108 which bear against the rear ends of the slides and which are screw-threaded in lugs 109 projecting inward from the brackets 110. By adjusting the screws 108 the distance between the rollers 96 and the roller 99 may be increased or diminished to some extent irrespective of whether the shaft 103 is positioned in the front or rear bearings 104. The arms 102 are connected together at their rear ends by a rod 111 which serves to pivot the arms to an adjustable pitman 112. This pitman 112 at its lower end forms a head 113 having a way 114 for rollers 115 rotatively mounted on the outer ends of crank arms 116 fixed to a shaft 117. The crank arms 116 are arranged diametrically opposite to one another and the way 114 is so constructed that when the shaft 117 is turned the rollers 115 will alternatively enter the way at one end, push the pitman 112 upward, move the pitman 112 downward and then leave the way 114. The shaft 117 is rotated in a step by step movement so that the roller 99 will be held for a sufficient length of time below the level of the upper run of the chains 85 to allow a box to pass from in front of the roller 99 to the rear thereof and so that the roller 99 will be held for an interval of time above the level of the chains 85 to prevent the box on the chains 85 from moving onto the table 83 before the box on the table has been moved therefrom by the apparatus to which the boxes are fed, and these means will now be described. The shaft 117 is journaled in bearings 118 on the brackets 110, there being collars 119 on said shaft bearing against the inner faces of the bearings 118 to prevent endwise movement of said shaft. To one end of the shaft 117 is fixed a rotary member in the form of a disk 120 having radially extending slots 121 adapted to be engaged one at a time by either one of pins 122 on the adjacent chain 85 when the pin comes adjacent the sprocket wheel 90 engaging the chain on which the pins are mounted. The slots 121 may be of any number desired, and in the drawings there are shown four such slots quartered or arranged at 90° of circular measurement from one another. The portions of the chain 25 adjacent the slotted disk 120 extend from the sprockets 86 to the sprocket 90 in planes that are substantially 90° of circular measurement from one another so that either of the pins 122 will readily enter the outer end of any one of the slots 121 in register with said pin, then move the disk 120 through an angle of 90° and then leave the slot. Thus it is clear since there are two pins 122 in this instance that, for every revolution of the chain 85, the disk 120 is turned through an angle of 180°.

The momentum given to the disk 120 by the pin 122 might cause the disk 120 to rotate more than 90° at one time if no means were provided to prevent it and such means have been provided and will now be described. The pin 122, as it moves downward in any one of the slots 121 which it happens to engage, engages the edge of a latch plate 123 carrying a lug 124 adapted to engage any one of the slots 121 that may at the time be in registration with the lug, the position of the lug 124 being such that it is in line with one of the slots 121 when the pin 122 engages another of said slots. The plate 123 is shiftably mounted on the hub 125 of the slotted disk 120 and for this purpose is provided with a slot 126 to accommodate the hub 125. The locking plate 123 is provided with an ear 127 projecting through a slot 128 in an extension 110' of one of the brackets 110. Thus this bracket and its ear 127 prevent rotation of the locking plate 123 and allow said locking plate to be shifted and the ear guides the plate. Between the ear 127 and a lug 129 on the bracket extension 110' is a coil spring 130 which is put under compression when the locking plate 123 is moved in a direction to retract the lug 124 from the appropriate slot 121. Thus it is clear that, when the pin 122 moves past the locking plate 123 and out of engagement therewith so as to release it, the lug 124 will ride on the periphery of the disk 120 until the next succeeding slot 121 comes into registration with said lug, whereupon the expansive force of the spring 130 will operate to retract the locking plate 123 to move the lug 124 into the adjacent slot 121, thus stopping rotation of the disk 120 and preventing further rotation thereof until the other pin 122 again engages the locking plate 123 to retract the lug 124 from the slot 121.

In practical operation, assuming that power has been applied to the sprocket wheel 23 to drive the apparatus and assuming at the start that boxes *a*, *b*, *c* are positioned in the apparatus, as in Fig. 1, the stop roller 99 has just risen so as to hold box *b* from advancing any farther toward the discharge end of the apparatus. The box *a* at the same time is moved by the rollers 96 onto the conveyer portion 83. The roller 99 retains the box *b* until the box *a* has been moved out of the horizontal path of movement of the box *b* by the elevator 133 or other apparatus with which the box feeder is associated. Thereupon one of the pins 122 engages the plate 123 and moves it out of locking position as in Fig. 4. The pin 122 thus unlocking the plate 123 continues to move and rotate the disk 120 through an angle of 90°, whereupon the lug 124 engages the appropriate slot 121 to lock the disk against further movement as in Fig. 1. This quarter rotation of the disk 120 turns the shaft 117 one quarter of a revolution so as to cause one of the crank arms 116 to retract the pitman 112 and thereby retract the roller 99 from engagement with the box *b*.

When the roller 99 has been thus retracted the box *b* is impelled by the chains 85 and rollers 96 toward the conveyer. By the time that the box *b* has passed to the rear of the roller 99, the second pin 122 has come into position to engage the locking plate 123 and rotate the disk 120 another quarter of a turn. This turning of the disk 120 has caused upward movement of the pitman 112 to move the roller 99 to position in rear of the next succeeding box *c* which meantime has taken the place of the box *b* on the chains 85. This box *c* is stopped by the roller 99. The box *b* continues to move toward the discharge end of the apparatus until it is in correct position on the table 83 for delivery to the elevator 133 or other apparatus with which the box feeding apparatus is associated.

The invention is not limited in its broader aspects to the exact construction described above and shown in the drawings, but the invention includes such changes and modifications as lie within the spirit and scope of the appended claims.

We claim:—

1. In a box handling apparatus, a conveyer, means to space adjacent boxes from one another on the conveyer, a stop adapted to be moved into the space between the adjacent boxes, means to intermittently operate the stop to and from said space, and means to positively move one of said boxes away from the other while the stop is positioned in said space.

2. In a box handling apparatus, endless chains, box supports having horizontally projecting members and fastened to the chains, means to operate the chains, a table through which the box supports pass, and means to positively engage and propel boxes one at a time to the table.

3. In a box handling apparatus, rotatively mounted conveyer chains, means to feed boxes to the chains, means on the chains to engage the box thereon and space it from the next succeeding box, means to rotate the chains, and means operating at predetermined intervals of time to hold the box on the chains against movement.

4. In a box handling apparatus, box-moving means, and means associated with the box-moving means and operating at predetermined intervals of time to hold the box against being impelled by the box-moving means.

5. In a box handling apparatus, conveyer chains, means to operate said chains, a box-engaging abutment on each chain, a box-engaging abutment adapted to engage the front end of a box on the chains, and means operated by one of the chains to move the second named abutment alternatively up and down into and out of box-engaging positions respectively.

6. In a box-handling apparatus, box-conveying means, a box-engaging abutment adapted to engage the front end of a box on the box-conveying means, and means operated by the box-conveying means to move the abutment alternatively up and down into and out of box-engaging positions respectively.

7. In a box handling apparatus, endless box-conveying means, a pin on the box-conveying means, a box-engaging abutment adapted to engage the front end of a box on the box-conveying means, and means operated in a step-by-step motion by the pin as the box-conveying means operates to move the abutment alternatively up and down into and out of box-engaging positions respectively.

8. In a box handling apparatus, endless box-conveying means, a pin on the box-conveying means, a box-engaging abutment adapted to engage the front end of a box on the box-conveying means, and a rotative member operatively connected with the abutment and having a slot engageable by the pin once in every revolution of the box-conveying means.

9. In a box handling apparatus, endless box-conveying means, a pin on the box-conveying means, a box-engaging abutment adapted to engage the front end of a box on the box-conveying means, a rotative member operatively connected with the abutment and having a slot engageable by the pin once in every revolution of the box-conveying means, and means to hold the rotative member against rotation except when said member is being actuated by the pin.

10. In a box handling apparatus, endless box-conveying means, a pin on the box-conveying means, a box-engaging abutment adapted to engage the front end of a box on the box-conveying means, a rotative member operatively connected with the abutment and having a slot engageable by the pin once in every revolution of the box-conveying means, and means retractive by the pin as it enters the slot to lock the rotative member against rotation.

11. In a box handling apparatus, endless box-conveying means, a pin on the box-conveying means, a box-engaging abutment adapted to engage the front end of a box on the box-conveying means, and means connected with the abutment and operative by the pin once in every revolution of the box-conveying means to alternatively move the abutment up and down into and out of box-engaging position respectively.

12. In a box handling apparatus, endless box-conveying means, a pin on the box-conveying means, a box-engaging abutment adapted to engage the front end of a box on the box-conveying means, means connected with the abutment and operative by the pin once in every revolution of the box-conveying means to alternatively move the abutment up and down into and out of box-engaging positions respectively, and other means adapted to lock the last named means against movement and adapted to be thrown out of locking position by the pin just before the pin causes operation of the abutment moving means.

13. In a box handling apparatus, conveying means having a portion inclined upwardly with respect to another adjacent portion to effect relative tilting of boxes on the two portions to create a space between the boxes, a stop, and means to intermittently operate the stop to and from said space.

14. In a box handling apparatus, endless chains, box supports having horizontally projecting members and fastened to the chains, a table through which the box supports pass, means to positively propel boxes on to the table, and an intermittently operated member cooperating with the propelling means to feed boxes one at a time to the table.

Signed this 7th day of August, 1923.
FRED STEBLER.
GEORGE T. STAMM.